United States Patent
Itagaki et al.

(10) Patent No.: US 8,427,990 B2
(45) Date of Patent: Apr. 23, 2013

(54) WIRELESS COMMUNICATION SYSTEM, WIRELESS COMMUNICATION APPARATUS, WIRELESS COMMUNICATION METHOD, AND PROGRAM

(75) Inventors: Takeshi Itagaki, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 937 days.

(21) Appl. No.: 12/430,457

(22) Filed: Apr. 27, 2009

(65) Prior Publication Data

US 2009/0268653 A1    Oct. 29, 2009

(30) Foreign Application Priority Data

Apr. 28, 2008   (JP) ................................ P2008-117242

(51) Int. Cl.
*G08C 17/00*    (2006.01)

(52) U.S. Cl.
USPC ........ 370/311; 455/456.1; 455/517; 709/228; 709/224; 370/254; 370/338; 370/328

(58) Field of Classification Search .................. 370/310, 370/331, 329, 338, 397, 469; 455/67.11, 455/67.13, 452.2, 517; 375/132
See application file for complete search history.

(56) References Cited

U.S. PATENT DOCUMENTS

| | | | | |
|---|---|---|---|---|
| 5,940,771 | A   * | 8/1999  | Gollnick et al. | 455/517 |
| 2004/0264504 | A1* | 12/2004 | Jin | 370/469 |
| 2006/0087995 | A1* | 4/2006  | Nago | 370/310 |
| 2006/0270415 | A1* | 11/2006 | Waxman | 455/452.2 |
| 2006/0285579 | A1* | 12/2006 | Rhee et al. | 375/132 |
| 2007/0008922 | A1* | 1/2007  | Abhishek et al. | 370/329 |
| 2007/0140188 | A1* | 6/2007  | Melkote et al. | 370/338 |
| 2008/0298375 | A1* | 12/2008 | Agardh et al. | 370/397 |

FOREIGN PATENT DOCUMENTS

| | | |
|---|---|---|
| JP | 08-294168 | 11/1996 |
| JP | 2004-72565 | 3/2004 |
| JP | 2007-174128 | 7/2007 |

* cited by examiner

*Primary Examiner* — Andrew Lai
*Assistant Examiner* — Jamaal Henson
(74) *Attorney, Agent, or Firm* — Sherr & Jiang, PLLC

(57) ABSTRACT

A wireless communication apparatus according to the invention includes a first wireless communication apparatus (STA1) which transmits search data to a second wireless communication apparatus (STA2) connected through an access point in a wireless communication network and determines whether a direct link setup to the second wireless communication apparatus (STA2) is possible based on search response data returned from the second wireless communication apparatus (STA2), and the second wireless communication apparatus (STA2) which receives the search data and transmits the search response data to the first wireless communication apparatus (STA1) when the second wireless communication apparatus (STA2) is compliant with the direct link setup.

9 Claims, 8 Drawing Sheets

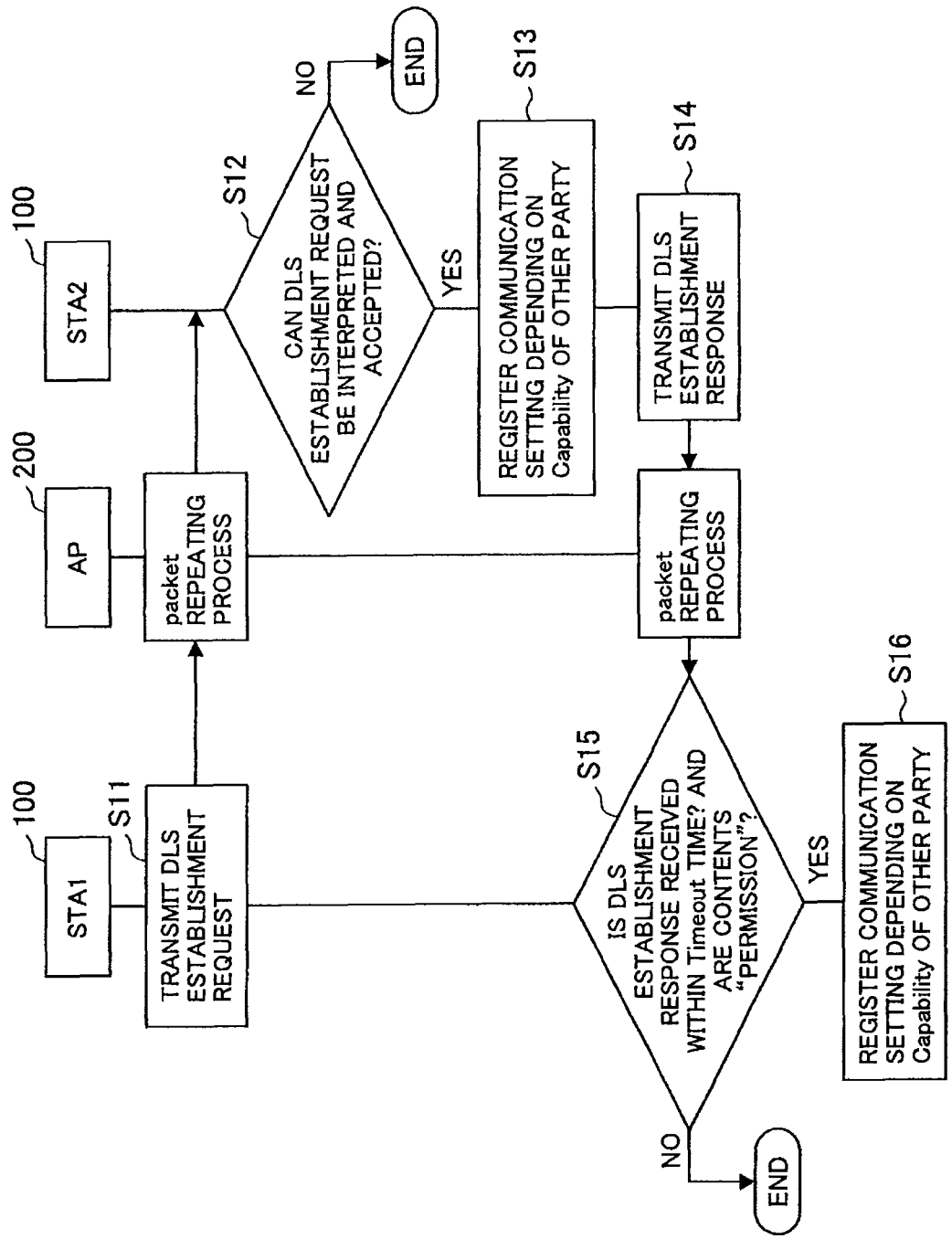

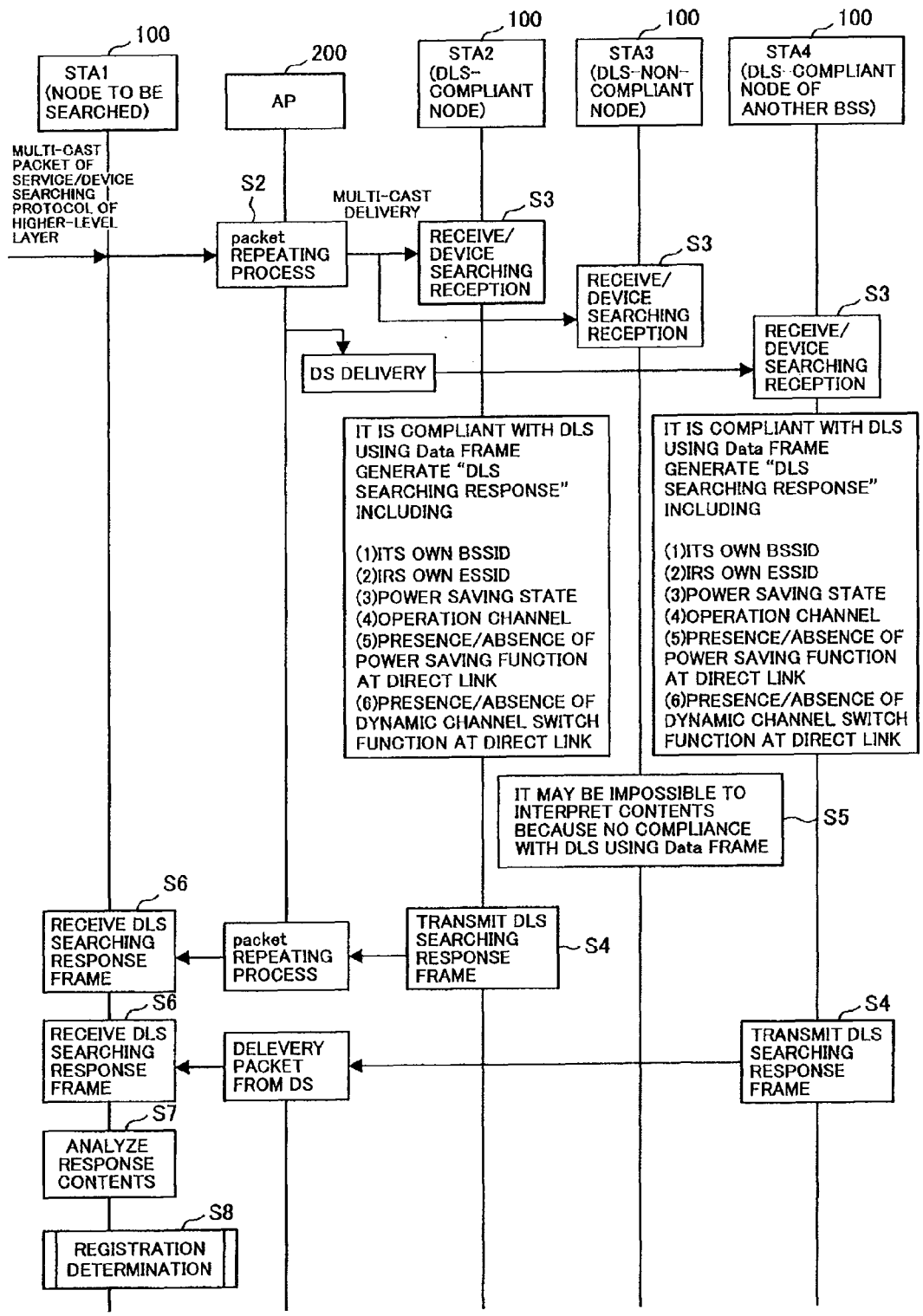

WIRELESS COMMUNICATION SYSTEM, WIRELESS COMMUNICATION APPARATUS, WIRELESS COMMUNICATION METHOD, AND PROGRAM

BACKGROUND OF THE INVENTION

1. Field of the Invention

The present invention relates to a wireless communication system, a wireless communication apparatus, a wireless communication method, and a program.

2. Description of the Related Art

Wireless LAN standards (IEEE802.11) include an infrastructure mode in which an access point adjusts access timings of a plurality of wireless terminal devices on a wireless network and an ad-hoc mode in which access timings are determined between wireless terminal devices.

In the infrastructure mode set through an access point, in comparison with the ad-hoc mode, a low throughput can be obtained. However, wireless terminals controlled under the access point can be connected to a wired LAN or the Internet. On the other hand, in the ad-hoc mode, since the wireless terminals directly communicate with each other, a throughput increases because an overhead is not caused by an access point relay. However, in the ad-hoc mode, it may be difficult to connect the wireless terminals to a wired LAN or the Internet.

As a scheme which utilizes the advantages of the two modes, a direct link protocol (DLP) scheme is defined as an optional function of IEEE802.11e. In this scheme, a direct communication link between wireless terminals is set while keeping an infrastructure mode, and the wireless terminals can directly communicate with each other.

[Patent Document 1] Japanese Patent Application Laid-Open No. 2004-72565

SUMMARY OF THE INVENTION

However, in the direct link protocol scheme, an access point necessarily supports the direct link protocol scheme. For this reason, unless the access point supports the direct link protocol scheme, it may be difficult to use the direct link protocol scheme.

The present invention has been made in views of the above issue, and it is desirable to provide a novel and improved wireless communication system, a wireless communication apparatus, a wireless communication method, and a program which can perform communication using a direct link protocol scheme even though an access point does not support the direct link protocol scheme.

According to an embodiment of the present invention, there is provided a wireless communication system including: a first wireless communication apparatus which transmits search data to a second wireless communication apparatus connected through an access point in a wireless communication network and determines whether a direct link setup to the second wireless communication apparatus is possible based on search response data returned from the second wireless communication apparatus; and the second wireless communication apparatus which receives the search data and transmits the search response data to the first wireless communication apparatus when the second wireless communication apparatus is compliant with the direct link setup.

The search response data may include at least one of a BSSID to which the second wireless communication apparatus belongs, an ESSID, a power saving state, a channel number, the presence/absence of a power saving communication function at a direct link, and the presence/absence of a dynamic channel changing function at the direct link.

The first wireless communication apparatus may include a registration control unit which determines that the second wireless communication apparatus is a communicatee to which a direct link can be set up when the BSSID included in the search response data is matched with a BSSID of its own apparatus, and registers the second wireless communication apparatus in a table.

The first wireless communication apparatus may include a registration control unit which determines that the second wireless communication apparatus as a communicatee to which a direct link can be set up when the BSSID included in the search response data is not matched with a BSSID of its own apparatus, when the ESSID included in the search response data is matched with the ESSID of its own apparatus, and when a channel number representing a frequency band used by the second wireless communication apparatus is matched with a channel number of its own apparatus and registers the second wireless communication apparatus in a table.

The first wireless communication apparatus may include a registration control unit which determines that the second wireless communication apparatus is a communicatee to which a direct link can set up when the BSSID included in the search response data is not matched with a BSSID of its own apparatus, when the ESSID included in the search response data is matched with the ESSID of its own apparatus, when a channel number representing a frequency band used by the second wireless communication apparatus is not matched with a channel number of its own apparatus, and the first or second wireless communication apparatus has a function of dynamically changing channels during the direct link.

The first wireless communication apparatus may perform transmission of the search data in synchronization with a service search protocol of a higher-level layer.

The first wireless communication apparatus may transmit the search data based on a multi-cast address of a service search/device search protocol packet of a higher-level layer.

The second wireless communication apparatus may transmit the search response data to the first wireless communication apparatus in a uni-cast manner.

According to another embodiment of the present invention, there is provided a wireless communication apparatus including: a transmitting unit which transmits, to another apparatus connected through an access point in a wireless communication network, search data which searches for whether the apparatus is compliant with a direct link setup; a receiving unit which receives search response data from the other apparatus which receives the search data; and a determining unit which determines whether a direct link setup to the second wireless communication apparatus is possible based on the search response data.

According to another embodiment of the present invention, there is provided a wireless communication method including the steps of: transmitting, to another apparatus connected through an access point in a wireless communication network, search data which searches for whether the apparatus is compliant with a direct link setup; receiving search response data from the other apparatus which receives the search data; and determining whether a direct link setup to the other apparatus is possible based on the search response data.

According to another embodiment of the present invention, there is provided a program to cause a computer to function as: a unit transmitting, to another apparatus connected through an access point in a wireless communication network, search data which searches for whether the apparatus is compliant with a direct link setup; a unit receiving search response data from the other apparatus which receives the search data; and a unit determining whether a direct link setup to the other apparatus is possible based on the search response data.

According to the present invention, even though an access point does not support a direct link protocol scheme, communication by the direct link protocol scheme is possible.

BRIEF DESCRIPTION OF THE DRAWINGS

FIG. 7 is a flow chart showing a direct link establishing process; and

FIG. 8 is a flow chart showing a directly linkable node searching process in a second embodiment.

DETAILED DESCRIPTION OF THE PREFERRED EMBODIMENTS

Figure 1:
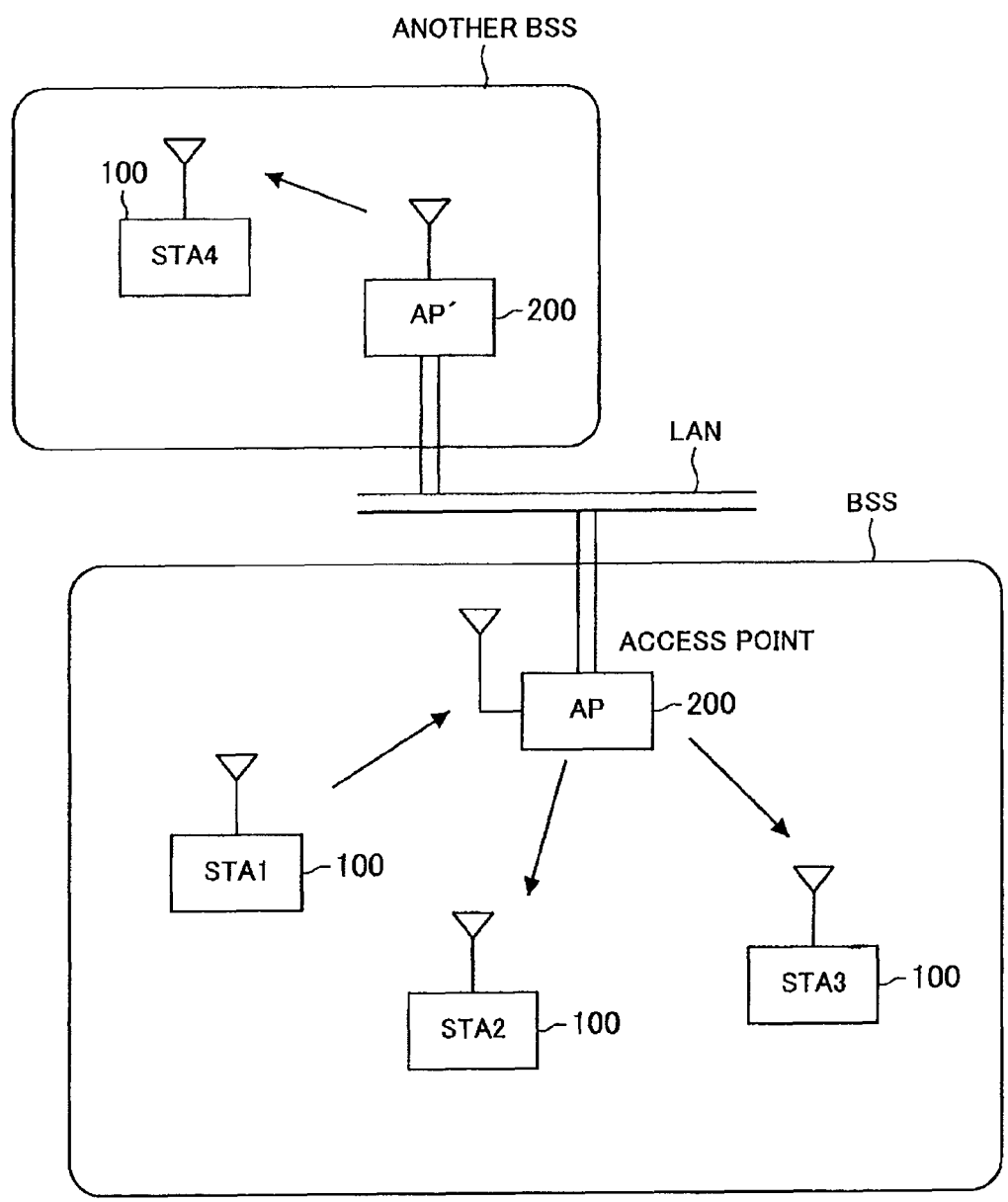
FIG. 1 is a pattern diagram showing an example of the configuration of a wireless communication system according to each of embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

FIG. 1 is a pattern diagram showing an example of the configuration of a wireless communication system according to each of embodiments of the present invention. The system according to the embodiment includes a plurality of wireless communication apparatuses 100 (STA1, STA2, STA3, and STA4) and access points (AP1 and AP2) 200. In the embodiment, the access point 200 is a general access point which is usually used and does not need a special function. The AP1 and AP2 are connected by a local area network (LAN). In each of the wireless communication apparatuses 100, in addition to a normal operation of a wireless LAN, a direct link path setting function operates. It is assumed that each of the wireless communication apparatuses 100 (STA1, STA2, STA3, and STA4) is associated with the access point (AP) 200 in advance.

In FIG. 1, the STA1, STA2, and STA3 are controlled under the AP1, and the STA1, STA2, and STA3 have the same BSSID. On the other hand, the STA4 is controlled under the AP2 and has a BSSID different from those of the STA1, STA2, and STA3. The STA1, STA2, STA3, and STA4 are present in the same segment of an IP network and have the same ESSID. Therefore, data transmitted by broadcasting from the STAs are transmitted to apparatuses having different BSSIDs.

Figure 2:
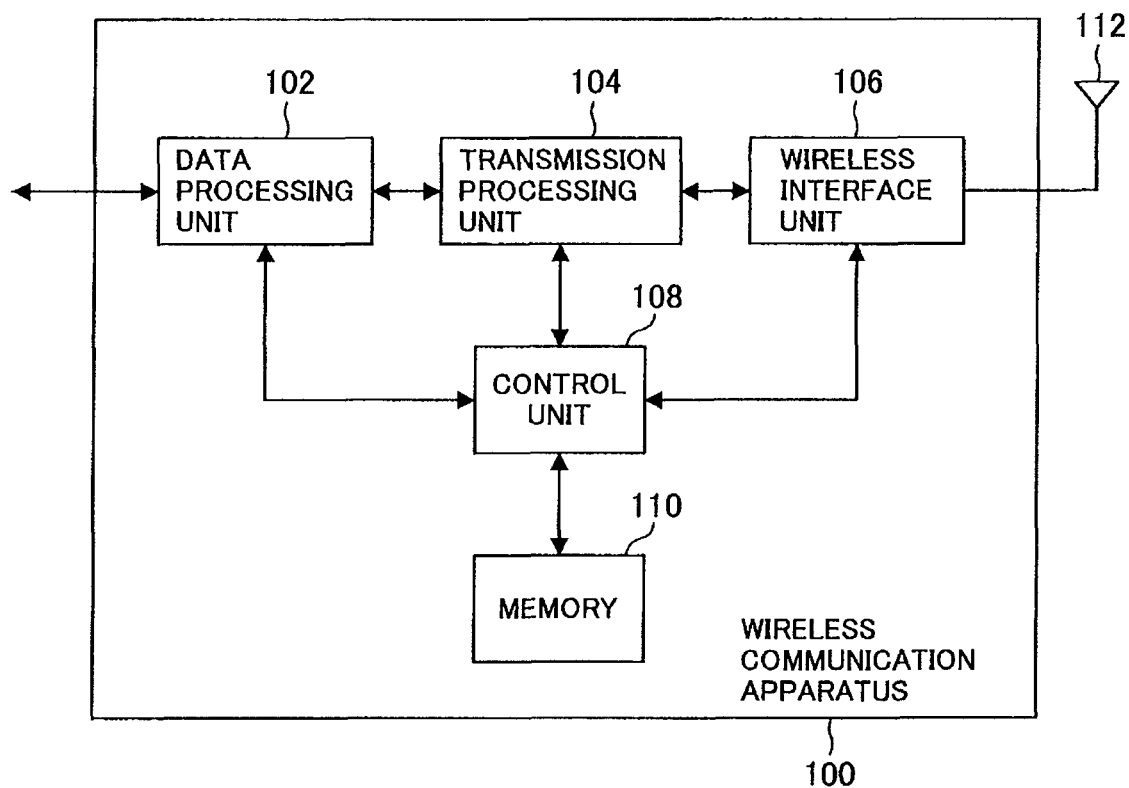
FIG. 2 is a block diagram showing an example of the configuration of a wireless communication apparatus.

FIG. 2 is a block diagram showing an example of the configuration of the wireless communication apparatus 100. As shown in FIG. 2, each of the wireless communication apparatuses 100 includes a data processing unit 102, a transmission processing unit 104, a wireless interface unit 106, a control unit 108, a memory 110, and an antenna 112. In a transmission state, the data processing unit 102 creates various data frames and various data packets in response to a request from, for example, a higher-level layer to supply the data frames and the data packets to the transmission processing unit 104. The transmission processing unit 104 performs a process which performs addition or the like of error detection codes such as various data headers or FCSs (Frame Check Sequences) to the packets created by the data processing unit 102 in a transmission state, and provides the processed data to the wireless interface unit 106. The wireless interface unit 106 generates a modulation signal in a frequency band of a carrier wave from the data received from the transmission processing unit 104 and causes the antenna 112 to transmit the modulation signal as a wireless signal.

In a receiving operation, the wireless interface unit 106 down-converts the wireless signal received by the antenna 112 and converts the wireless signal into a bit string to decode various data frames. More specifically, the wireless interface unit 106 can function as a transmission unit and a receiving unit in cooperation with the antenna 112. The transmission processing unit 104 analyzes headers added to various data frames supplied from the wireless interface unit 106. When the transmission processing unit 104 confirms that the data frames have no errors based on the error detection codes, the transmission processing unit 104 supplies the various data frames to the data processing unit 102. The data processing unit 102 processes and analyzes the various data frame and the various data packets supplied from the transmission processing unit 104.

The control unit 108 controls various operations such as a receiving operation and a transmitting operation of the wireless communication apparatuses 100. As will be described below, the control unit 108 functions as a determining unit which determines whether the wireless communication apparatuses 100 is compliant with a unique DLS in a unique direct link setting process (DLS setting process; direct link setup). The memory 110 plays a role as a work area for data processing performed by the control unit 108 and functions as a storage medium which holds various data. As the memory 110, various recording media such as a nonvolatile memory such as a DRAM, a nonvolatile memory such as an EEPROM, a hard disk, and an optical disk can be used.

Each block shown in FIG. 1 can be configured by hardware (circuit). Each of the blocks can also be configured by an arithmetic processing unit (CPU) and software (program) which causes the arithmetic processing unit to function. In this case, the program can be supplied in a recording medium such as the memory 110 included in the wireless communication apparatuses 100.

Figure 3:
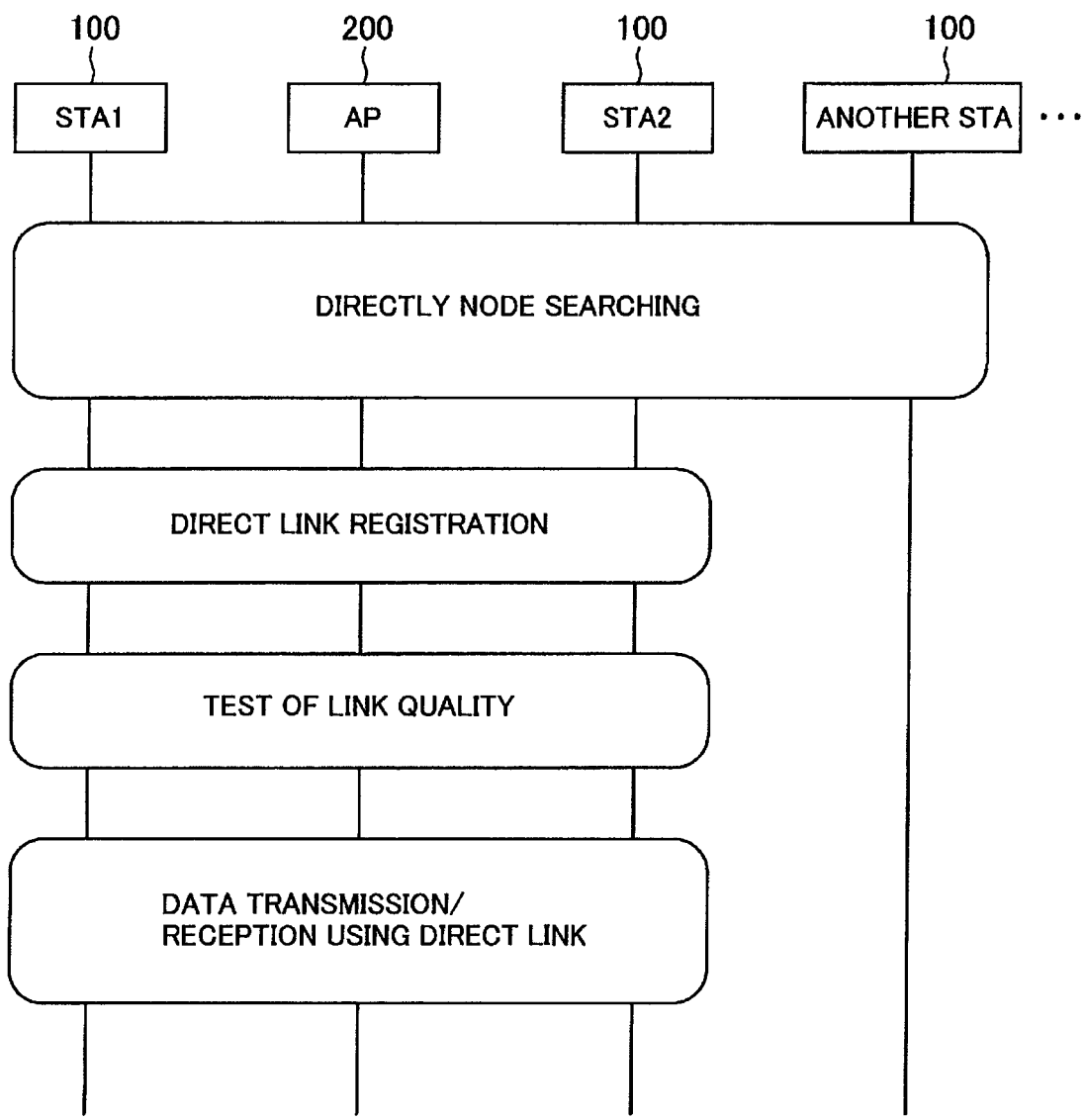
FIG. 3 is a pattern diagram showing an outline of processes performed by the wireless communication apparatus according to the embodiment.

FIG. 3 is a pattern diagram showing an outline of processes performed by the wireless communication apparatus 100 according to the embodiment. As shown in FIG. 3, the outline of the processes performed by the wireless communication apparatuses 100 according to the embodiment includes four processes, i.e., "directly linkable node searching", "direct link establishment", "link quality measurement", and "data transmission/reception".

The "directly linkable node searching" is a process in which the wireless communication apparatuses 100 actively searches for another wireless communication apparatuses 100 (STA) which can perform DLS (direct link setup) in a state in which the wireless communication apparatuses 100 perform a normal operation of a wireless LAN.

The "direct link establishment" is a series of frame exchange operations in which the wireless communication apparatus 100 encapsulates information such as capabilities of another specific wireless communication apparatus 100 and its own wireless communication apparatus 100 into a data frame to exchange the information with a communicatee. According to the process, a direct link to the communicatee is established.

The "link quality measurement" is an operation which obtains information related to quality of a direct link and information related to quality of a link to the access point 200, and is a process which is necessary to select an appropriate path and to perform direct link communication.

The "data transmission/reception" is a process which performs transmission/reception of a traffic by using a direct link while appropriately switching paths.

Figure 4:
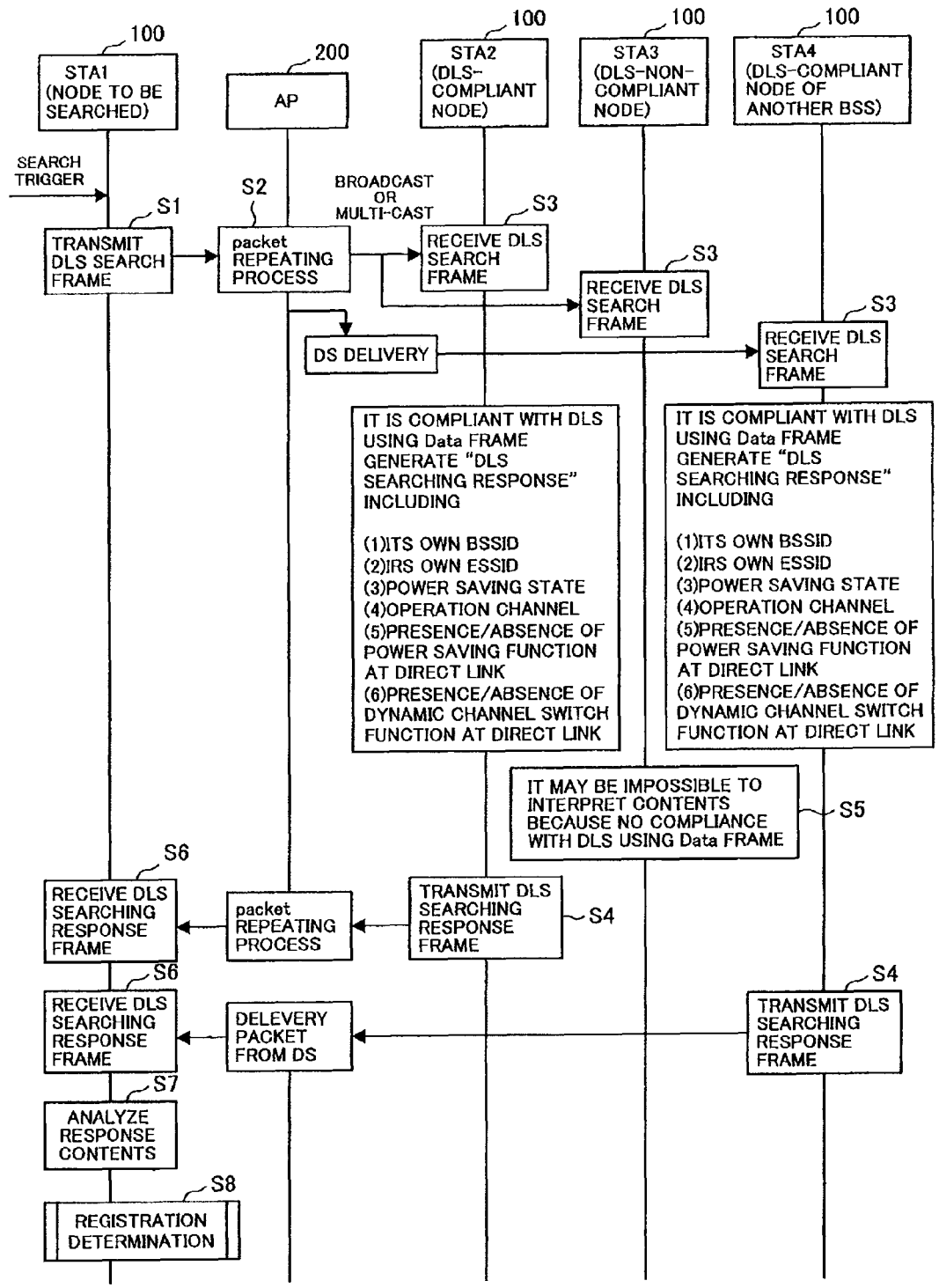
FIG. 4 is a pattern diagram showing processes of directly linkable node searching.

The "directly linkable node searching" which is a characteristic feature of the embodiment will be described below in detail. FIG. 4 is a pattern diagram showing processes of directly linkable node searching. In this case, of the plurality of wireless communication apparatuses 100, the STA1 searches for a directly linkable node. The processes shown in FIG. 4 can be realized by an arithmetic processing unit (CPU) of the wireless communication apparatus 100 and software (program) which causes the arithmetic processing unit to function. In this case, the program can be stored in the memory 110 included in the wireless communication apparatuses 100.

The STA1 transmits, to the access point 200 (AP1), a frame (to be referred to as a DLS search frame) which searches for whether the STA1 is compliant with a DLS function when association with the access point 200 is established (step S1). The access point 200 (AP1) transmits the DLS search frame to another wireless communication apparatus 100 (STA2 and STA3) in a broadcast or multi-cast manner (step S2). The access point 200 (AP1) transmits the DLS search frame to the STA4 by DS delivery through the access point 200 (AP2). The DLS search frame is a data frame representing contents which mean that "respond to a DLS-compliant STA". In the embodiment, as an example of the DLS search frame, a data frame in which the contents are described as an ID and encapsulated by a dedicated EtherType or the like is supposed.

More specifically, the DLS search frame is encapsulated as a data frame of a specific Ethertype for DLS. In the access point 200, the data frame is recognized as a normal data frame. For this reason, the access point 200 transmits the data frame to the wireless communication apparatuses 100 without recognizing the data frame as a DLS search frame.

Figure 5:
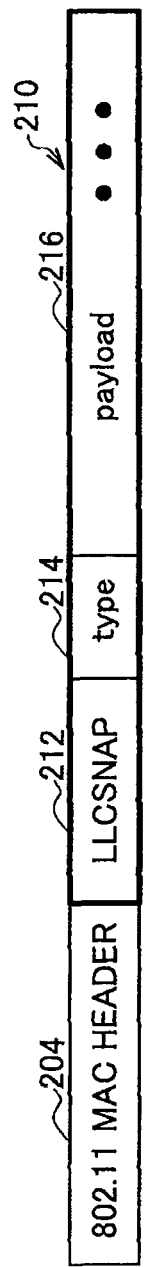
FIG. 5 is an explanatory diagram showing a frame configuration of a data frame.

FIG. 5 is an explanatory diagram showing a frame configuration of a data frame. As shown in FIG. 5, the data frame includes a 802.11 MAC header 204 and an MSDU (MAC Service Date Unit) 210. The 802.11 MAC header 204 includes a TA representing a source address of the data frame, an RA representing a destination address of the data frame, and the like. For example, when the STA1 transmits a data frame to the STA2 through the access point 200, a 802.11 MAC header 204 of the data frame includes a TA in which the address of the STA1 is described, an RA in which the address of the access point 200 (AP1) is described, and a DA in which the address of the STA2 is described.

The MSDU 210 includes an LLCSNAP (Logical Link Protocol Sub-Network Access Protocol) 212, a type 214, and a payload 216.

The LLCSNAP 212 is an 8-bit fixed pattern and is set to control a logical link. The type 214 is information representing a frame type of the data frame. For example, in the type 214 of the DLS search response frame, 2-byte information representing the data frame is a DLS search response frame is described. In the payload 216 of the DLS search response frame, a direct link setting message is described. Similarly, in the type 214 of the DLS search response frame, 2-byte information representing the data frame is a DLS search response frame is described. In the payload 216 of the DLS search response frame, a direct link setting message is described.

Since the DLS search frame is not a management frame, the access point 200 delivers the DLS search frame to the other wireless communication apparatuses 100 (STA2, STA3, and STA4) in a broadcast or multi-cast manner. The DLS search frame repeated by the access point 200 is transmitted to the other wireless communication apparatuses 100 (STA2, STA3, and STA4) in the same network segment. The other wireless communication apparatuses 100 receive the DLS search frame (step S3).

The STAs which receive the DLS search frame interprets the DLS search frame when its own apparatus is compliant with a direct link setting function using a data frame. The STAs return response frames (to be referred to as "DLS search response frames" hereinafter) to the STA1 by a unicast manner when the DLS search frame can be interpreted (step S4).

In this case, it is assumed that the STA2 and STA4 of the plurality of wireless communication apparatuses 100 in the same network segment are compliant with the direct link setting function. The STA2 and STA4 return the DLS search response frames including the following contents to the STA1. The following contents are described in the payload 216 of each of the DLS search response frames.

BSSID to which its own apparatus (STA2 or STA4) belongs

ESSID to which its own apparatus belongs

Power saving state of its own apparatus

Channel number of a channel in which its own apparatus operates

Presence/absence of power saving communication function at a direct link in its own apparatus Presence/absence of dynamic channel changing function at a direct link in its own apparatus The BSSID mentioned here is an ID of a base station (BSS) and a MAC address of the access point 200. The ESSID is an ID indicating a name of a network. The ESS is a set of base stations connected by a DS. However, the ESS does not include the DS itself. Data broadcast-transmitted from the access point 200 is also transmitted to the wireless communication apparatuses 100 having different ESSIDs in the same segment in the IP network.

The power saving state is expressed by two states, i.e., an "active state (non-power saving state)" and a "power saving state (during power saving)". Power saving states of the present STA2 and STA4 are informed. A channel number of a channel in which its own apparatus operates is a channel number indicating a frequency band used by its own apparatus.

A power saving communication function at a direct link is a function which can use a direct link path without changing a power saving state. The dynamic channel changing function at the direct link is a function which can dynamically change channels only when the direct link path is used.

When the wireless communication apparatus 100 which receives the DLS search frame is not compliant with the DLS using a data frame, the DLS search frame is handled as an unknown frame. In this case, it may be difficult that the wireless communication apparatus 100 interprets the contents of the DLS search frame, and the DLS search frame is discarded in the apparatus. In the example in FIG. 4, since the STA3 is not compliant with a DLS function, the DLS search response frame is not returned to the STA1 (step S5).

The STA1 receives the DLS search response frames from the STA2 and STA4 which are compliant with the DLS (step S6). The STA1 compares information described in the DLS search response frame with its own corresponding function to interpret the contents of the DLS search response frame (step S7). The STA1, based on a comparison result, determines whether the STA2 and the STA4 are registered in the "DLS possible node table" (step S8).

Figure 6:
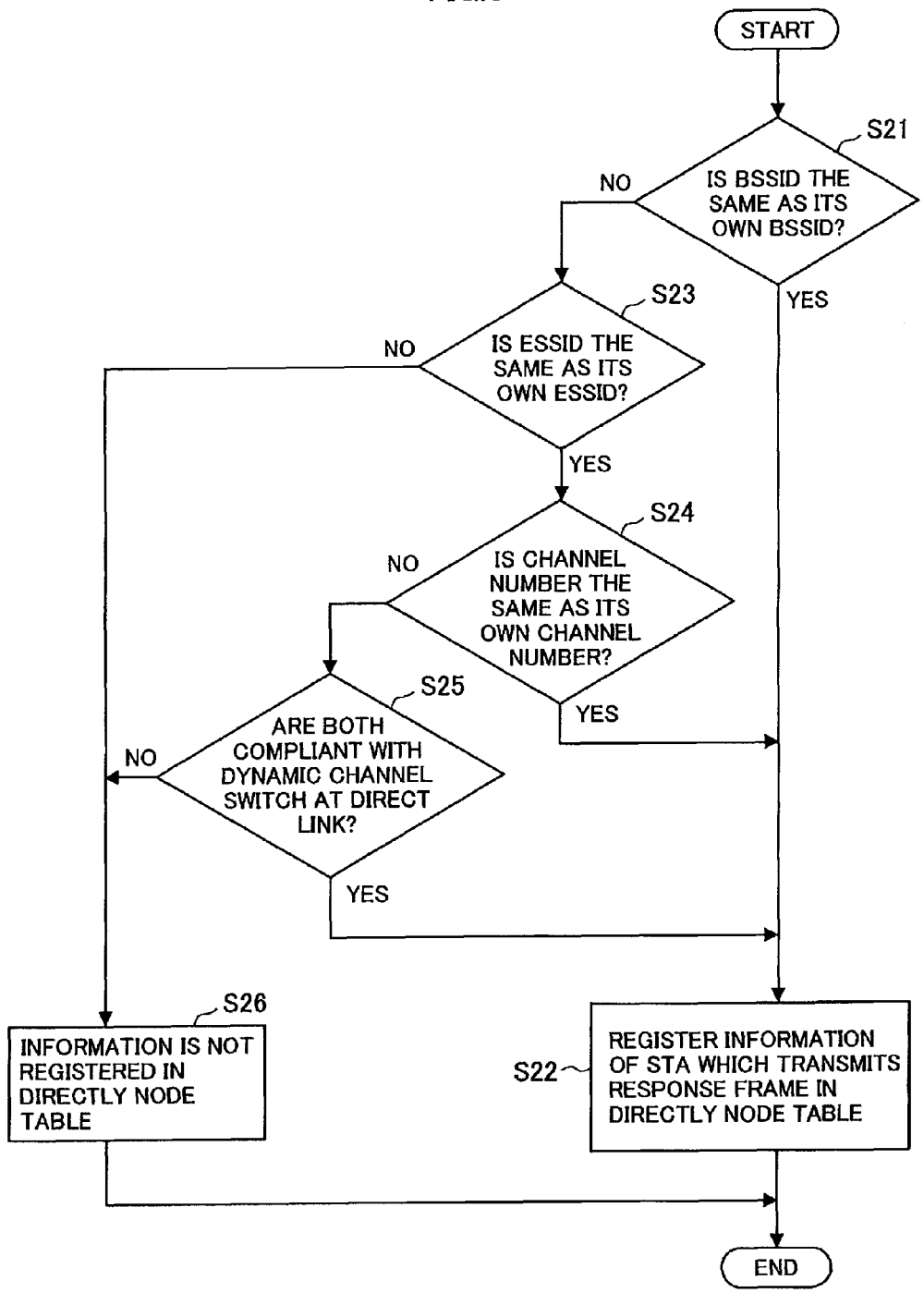
FIG. 6 is a flow chart showing determination processes which determines whether STA2 and STA4 are registered in a "DLS possible node table"

In step S8 in FIG. 4, it is determined by the control unit 108 according to the flow chart in FIG. 6 whether the STA2 and the STA4 which transmit the DLS search response frames are registered in the "DLS possible node table".

In step S21, the STA1 determines whether the BSSIDs of the STA2 and the STA4 are the same as a BSSID to which the STA1 itself belong. When the BSSIDs are the same, the operation returns to step S22 to register information of an STA which transmits the DLS search response frame in a directly linkable node table. On the other hand, when the BSSIDs are not the same, the operation proceeds to step S23.

In step S23, it is determined that the ESSIDs of the STA2 and the STA4 are the same as the ESSID of the STA1 itself. When the ESSIDs are the same, the operation proceeds to step S24 to determine whether channel numbers are the same. On the other hand, when the ESSIDs are not the same, the operation proceeds to step S26 to perform a process in which the STA2 and the STA4 are not registered in the directly linkable node table.

When the channel numbers are the same in step S24, the operation proceeds to step S22 to register the information of the STAs having the same channel numbers are registered in the directly linkable node table. On the other hand, when the channel numbers are not the same, the operation proceeds to step S25. In step S25, it is determined that both the STA1 and the STA2 (or STA4) which transmits the DLS search response frame are compliant with a dynamic channel switch.

When the STA1 and the STA2 are compliant with the dynamic channel switch, the operation proceeds to step S22, information of the STA (STA2 or STA4) which is compliant with the dynamic channel switch is registered in the directly linkable node table. On the other hand, when the STA1 and the STA2 are not compliant with the dynamic channel switch, a process in which the STA2 and STA4 are not registered in the directly linkable node table.

In the embodiment, in the response frame from the STA4, the BSSID of the STA4 is not different from the BSSID of the STA1. However, the ESSID of the STA4 is the same as the ESSID of the STA1. Therefore, when the channel number of the is the same as the channel number of the STA1, the STA1 adds the STA4 to the directly linkable node table because a direct link connection using the same channel is possible.

Even though the channel number of the STA4 is the same as the channel number of the STA1, when both the STA1 and the include dynamic channel switch functions, the channels are dynamically changed to enable connection. Therefore, even in that case, the STA1 adds the STA4 to the directly linkable node table.

A trigger of a "DLS search frame" transmitting operation may be synchronized with not only completion of association but also the end of the long-period timer or the like.

[Direct Link Establishment]

As described above, the STA1 which tables compliant states of surrounding STAs with the DLS function starts direct link establishment to an STA having a MAC address which is present in the table. A trigger of establishment start may be a timing at which communication with the STA occurs. FIG. 7 shows a flow chart of a direct link establishing process. In the direct link establishment, setting request/response of a direct link is encapsulated and exchanged. The direct link establishment does not use a Management frame unlike a DLS defined by IEEE802.11e standards. For this reason, the access point 200 which repeats a data frame need not be aware of the contents of the frame, and the process is completed between only two STAs. Corresponding capabilities of the STAs are exchanged by the frame exchange, so that the STA1 can register the STA and directly transmit the data frame to the STA.

FIG. 7 illustrates the case in which a DLS establishment request performed by the STA1 to the STA2. A DLS establishment request performed by the STA1 to the STA4 is performed in the same manner as described above. The STA1 transmits the DLS establishment request to the STA2 (step S11). The STA2 which receives the DLS establishment request through the repeating by the access point 200 (AP1) determines whether the DLS establishment request can be interpreted and determines whether the DLS establishment request is accepted (step S12). When the DLS establishment request can be interpreted and the DLS establishment request is accepted, a communication setting is registered depending on the capability of the STA1 (step S13), and a DLS establishment response is returned to the STA1 (step S14). On the other hand, when the DLS establishment request can be hardly interpreted, or when the DLS establishment request is not accepted, the process is ended.

The STA1 which receives the DLS establishment response determines whether the DLS establishment response is received within time-out time, and determines whether the contents of the DLS establishment response are "permission" (step S15). When DLS establishment response is received within the time-out time, and the contents of the DLS establishment response are "permission", a communication setting is registered depending on the capability of the STA2 (step S16). On the other hand, when the DLS establishment response is not received within the time-out time, or when the contents of the DLS establishment response are "unpermission", the process is ended without registering the communication setting.

When a transmission destination (STA2) of the establishment request is in a power saving state and is not compliant with a power saving function in a direct link, a "normally wake-up request" is added to an establishment request transmitted from the STA1. When the STA2 which receives the establishment request agrees with the establishment of the DLS, a normally wake-up state is set.

[Link Quality Measurement]

When direct link establishment is completed, it is not confirmed that reliability of an STA1-to-STA2 link can be used. In the link quality measurement, the reliability is measured. In the embodiment, although a measuring method is not limited to a specific one, a method of transmitting a test packet to a communicatee to receive a transmission result or wireless quality from the communicatee can be supposed.

[Data Transmission/Reception]

With the above processes, between the STA1 and the STA2, and between the STA1 and the STA4, registration of direct links and measurement of establishment and communication quality are completed. The STA1 and the STA2 perform data transmission/reception using a direct link as needed in consideration of a power saving state. At this time the STA1 refers function information of the communicatee acquired in registration and does not perform communication by a direct link while the communicatee is in a power saving state when the communicatee is not compliant with the power saving communication function at the direct link.

Like a relationship between the STA1 and the STA4, a relationship between "nodes have different BSSIDs and different channels but the same ESSIDs" may be added to the directly linkable node table at the search of directly linkable node. In this case, in the STA1, direct link communication is performed by the following procedures. When data transmission is performed to the STA4, the STA1 notifies the access point 200 of its own BSS that the state of the STA1 is set to a power saving state. Thereafter, an operation channel is switched to a channel of the STA4 described in the "directly linkable node table", and direct link data is transmitted to the STA4. In this manner, a direct link between BSSs can be realized, and management of a table can be performed to be extended to ESS units.

Second Embodiment

FIG. 8 is a flow chart showing a directly linkable node search process in a second embodiment. In the second embodiment, a frame corresponding to a DLS search frame in the first embodiment is not explicitly transmitted, a multi-cast frame (SSDP NOTIFY, SSDP M-SEARCH, or the like) obtained by a service search/device search protocol of a higher-level layer is used in place of the DLS search frame. In a device or the like corresponding to the UPnP, such a service search frame is periodically transmitted. These frames transmitted from the STA1 are repeated by the access point 200 and delivered to STAs in the same ESS. In this manner, the frame is synchronized with the search protocol of the higher-level layer, so that a processing load can be reduced, and a DLS function search operation can be more efficiently performed.

In FIG. 8, it is assumed that the STA2 and the STA4 are DLS-compliant devices and devices which can receive multi-cast frames obtained by the service search/device search protocol of the higher-level layer. The STA2 and the STA4 which detect reception of the service search frames acts like STAs which receive DLS search frames in the first embodiments. More specifically, as shown in FIG. 8, the multi-cast frame obtained by the service search/device search protocol is transmitted to the STA2 to STA4 by the access point 200 (step S2), and the STA2 to STA4 receive the multi-cast frames (step S3). The subsequent processes are the same as those in FIG. 4.

When its own apparatus is compliant with a direct link setting function using a data frame, and a search frame can be interpreted, each of the STAs returns a response frame to the STA1 in a uni-cast manner (step S4). In this case, like the STA3, the apparatus is not compliant with the DLS setting function using a data frame, only a multi-cast frame obtained by a higher-level layer protocol, and a response is not returned (step S5).

In the second embodiment, although the STA1 does not explicitly transmit a DLS search frame, the STA1 normally waits for a DLS search response frame. The STA1 which receives the response frames from the STA2 and the STA4 performs registration to a directly linkable node table based on the response frames as in the first embodiment.

The present application contains subject matter related to that disclosed in Japanese Priority Patent Application JP 2008-117242 filed in the Japan Patent Office on Apr. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system comprising:
a first wireless communication apparatus which transmits search data to a second wireless communication apparatus connected through an access point in a wireless communication network and determines whether a direct link setup to the second wireless communication apparatus is possible based on search response data returned from the second wireless communication apparatus; and
the second wireless communication apparatus which receives the search data and transmits the search response data to the first wireless communication apparatus when the second wireless communication apparatus is compliant with the direct link setup;
the first wireless communication apparatus including a registration control unit which registers the second wireless communication apparatus in a directly linkable node table, if it is determined that the second wireless communication apparatus is a communicatee to which the direct link can be set up, the determination comprising determinations that: a BSSID included in the search response data is not matched with a BSSID of the first wireless communication apparatus, an ESSID included in the search response data is matched with an ESSID of the first wireless communication apparatus, and either:
a channel number representing a frequency band used by the second wireless communication apparatus is matched with a channel number of the first wireless communication apparatus, or
the channel number representing the frequency band is not matched with a channel number of the first wireless communication apparatus, and the first or second wireless communication apparatus has a function of dynamically changing channels during the direct link.

2. The wireless communication system according to claim 1, wherein the search response data includes at least one of a BSSID to which the second wireless communication apparatus belongs, an ESSID, a power saving state, a channel number, a presence/absence of a power saving communication function at the direct link, and a presence/absence of a dynamic channel changing function at the direct link.

3. The wireless communication system according to claim 1, wherein the registration control unit determines that the second wireless communication apparatus is a communicatee to which the direct link can be set up when a BSSID included in the search response data is matched with a BSSID of the first wireless communication apparatus.

4. The wireless communication system according to claim 1, wherein
the first wireless communication apparatus performs transmission of the search data in synchronization with a service search protocol of a higher-level layer.

5. The wireless communication system according to claim 1, wherein
the first wireless communication apparatus transmits the search data based on a multi-cast address of a service search/device search protocol packet of a higher-level layer.

6. The wireless communication system according to claim 5, wherein
the second wireless communication apparatus transmits the search response data to the first wireless communication apparatus in a uni-cast manner.

7. A wireless communication apparatus comprising:
a transmitting unit which transmits, to a second apparatus connected through an access point in a wireless communication network, search data on whether the second apparatus is compliant with a direct link setup to the second apparatus;
a receiving unit which receives search response data from the second apparatus which receives the search data;
a determining unit which determines whether the direct link setup to the second apparatus is possible based on the search response data; and
a registration control unit which registers the second apparatus in a directly linkable node table, if it is determined that the second apparatus is a communicatee to which the direct link can be set up, the determination comprising determinations that: a BSSID included in the search response data is not matched with a BSSID of the wireless communication apparatus, an ESSID included in the search response data is matched with an ESSID of the wireless communication apparatus, and either:
a channel number representing a frequency band used by the second apparatus is matched with a channel number of the wireless communication apparatus, or
the channel number representing the frequency band is not matched with a channel number of the wireless communication apparatus, and the wireless communication apparatus or second apparatus has a function of dynamically changing channels during the direct link.

8. A wireless communication method comprising the steps of:
transmitting, from a first apparatus to a second apparatus connected through an access point in a wireless communication network, search data on whether the second apparatus is compliant with a direct link setup to the second apparatus;
receiving search response data from the second apparatus which receives the search data;
determining whether the direct link setup to the second apparatus is possible based on the search response data; and
registering the second apparatus in a directly linkable node table, if it is determined that the second apparatus is a communicatee to which the direct link can be set up, the determination comprising determinations that: a BSSID included in the search response data is not matched with a BSSID of the first apparatus, an ESSID included in the search response data is matched with an ESSID of the first apparatus, and either:
a channel number representing a frequency band used by the second apparatus is matched with a channel number of the first apparatus, or
the channel number representing the frequency band is not matched with a channel number of the first apparatus, and the first or second apparatus has a function of dynamically changing channels during the direct link.

9. A non-transitory computer-readable medium having a program to cause a computer to function as:
a unit transmitting, from a first apparatus to a second apparatus connected through an access point in a wireless communication network, search data on whether the second apparatus is compliant with a direct link setup to the apparatus;
a unit receiving search response data from the second apparatus which receives the search data;
a unit determining whether the direct link setup to the second apparatus is possible based on the search response data; and
a unit registering the second apparatus in a directly linkable node table if it is determined that the second apparatus is a communicatee to which the direct link can be set up, the determination comprising determinations that: a BSSID included in the search response data is not matched with a BSSID of the first apparatus, an ESSID included in the search response data is matched with an ESSID of the first apparatus, and either:
a channel number representing a frequency band used by the second apparatus is matched with a channel number of the first apparatus, or
the channel number representing the frequency band is not matched with a channel number of the first apparatus, and the first or second apparatus has a function of dynamically changing channels during the direct link.

* * * * *